United States Patent
Jeon et al.

(10) Patent No.: US 8,441,708 B2
(45) Date of Patent: May 14, 2013

(54) ELECTROCHROMIC DEVICE AND METHOD OF MANUFACTURING THE SAME

(75) Inventors: Seog-Jin Jeon, Yongin-si (KR); Chang-Ho Noh, Suwon-si (KR); Wan-In Lee, Seoul (KR)

(73) Assignees: Samsung Electronics Co., Ltd. (KR); Inha-Industry Partnership Institute (KR)

( * ) Notice: Subject to any disclaimer, the term of this patent is extended or adjusted under 35 U.S.C. 154(b) by 60 days.

(21) Appl. No.: 12/827,204

(22) Filed: Jun. 30, 2010

(65) Prior Publication Data

US 2011/0043886 A1 Feb. 24, 2011

(30) Foreign Application Priority Data

Aug. 24, 2009 (KR) .................. 10-2009-0078046

(51) Int. Cl.
*G02F 1/153* (2006.01)
(52) U.S. Cl.
USPC ........................................ 359/273; 359/275
(58) Field of Classification Search .......... 359/273, 359/275
See application file for complete search history.

(56) References Cited

U.S. PATENT DOCUMENTS

| | | |
|---|---|---|
| 6,870,657 B1 | 3/2005 | Fitzmaurice et al. |
| 7,420,727 B2 | 9/2008 | Cassidy |
| 2006/0066933 A1 * | 3/2006 | Jagt et al. ............ 359/265 |
| 2006/0257485 A1 | 11/2006 | Kumacheva |
| 2008/0128287 A1 | 6/2008 | Wu et al. |

FOREIGN PATENT DOCUMENTS

| | | |
|---|---|---|
| JP | 2001035551 | 2/2001 |
| JP | 2001076772 | 3/2001 |
| JP | 2002100416 | 4/2002 |
| JP | 2005259514 | 9/2005 |
| JP | 2007534120 | 11/2007 |
| JP | 2009032663 | 2/2009 |
| KR | 1020090038631 | 4/2009 |
| WO | 9735227 | 9/1997 |
| WO | 9835267 | 8/1998 |

OTHER PUBLICATIONS

International Search Report for Application No. 10173723.7-2205 dated Aug. 12, 2010.
Kim et al.; "Formation of Highly Efficient Dye-Sensitized Solar Cells by Hierarchical Pore Generation with Nanoporous TiO2 Spheres" Advanced Materials, 2009, vol. 21, pp. 1-6.

* cited by examiner

*Primary Examiner* — James Jones
(74) *Attorney, Agent, or Firm* — Cantor Colburn LLP

(57) ABSTRACT

An electrochromic device includes a first electrode, a second electrode disposed opposite the first electrode, a porous electrochromic layer disposed on the first electrode or the second electrode, and an electrolyte disposed between the first electrode and the second electrode. The porous electrochromic layer includes different sized nanoparticle clusters, and each nanoparticle cluster includes a plurality of nanoparticles and an electrochromic material.

25 Claims, 10 Drawing Sheets

ELECTROCHROMIC DEVICE AND METHOD OF MANUFACTURING THE SAME

CROSS-REFERENCE TO RELATED APPLICATION

This application claims priority to Korean Patent Application No. 10-2009-0078046, filed on Aug. 24, 2009, and all the benefits accruing therefrom under 35 U.S.C. §119, the content of which in its entirety is herein incorporated by reference.

BACKGROUND

1) Field

The general inventive concept relates to an electrochromic device and a method of manufacturing the same. More particularly, the general inventive concept relates to a multi-pore structure electrochromic display device and a method of manufacturing the multi-pore structure electrochromic display device, as well as a composition used in the method.

2) Description of the Related Art

Electrochromism is a phenomenon in which a color, displayed on an electrochromic display device, reversibly changes based on a direction of an electric field from a voltage applied to the display device. An electrochromic material is a material having electrochromism, e.g., a material whose optical characteristics reversibly change due to an electrochemical reduction-oxidation ("redox") reaction. Whether a particular electrochromic material shows a given color generally depends on whether an electric field is applied to the material. Specifically, one type of electrochromic material does not show color until an electric field is applied to the material, thereby causing a reduction reaction in which the electrochromic material is reduced due to electron acceptance. Another type of electrochromic material shows color when no electric field is applied, and when an electric field is applied to the material, it loses the color, due to an oxidation reaction resulting in electron donation.

In addition to displaying a color image using the phenomenon described above, an electrochromic device also controls light transmission characteristics through the electrochromic material based on the magnitude of an electric current in the electrochromic material.

SUMMARY

The general inventive concept includes an electrochromic device for items such as smart windows having controlled light transmission characteristics, as well as display devices, such as electronic paper, for example. Moreover, the general inventive concept includes an electrochromic device having flexible display characteristics and significantly improved response speed. The general inventive concept also includes a method of manufacturing an electrochromic device and, more particularly, a simplified method that can performed at reduced temperatures. Additionally, the general inventive concept also includes a composition that may be used in the method.

Provided is an electrochromic device that includes a first electrode, a second electrode disposed opposite the first electrode, a porous electrochromic layer disposed on the first electrode or the second electrode, and an electrolyte disposed between the first electrode and the second electrode. The porous electrochromic layer includes nanoparticle clusters, and each nanoparticle cluster includes a plurality of nanoparticles and an electrochromic material.

The porous electrochromic layer may further include first pores disposed between adjacent nanoparticle clusters, and second pores disposed between adjacent nanoparticles inside each of the nanoparticle clusters.

The nanoparticles may include metal oxide.

The metal oxide may be titanium, tin, zinc, gallium, aluminum, strontium, selenium, niobium, barium, tantalum, zirconium, lead and/or any combinations thereof.

The metal oxide may be titanium dioxide ($TiO_2$), tin dioxide ($SnO_2$), zinc oxide (ZnO), lead oxide (PbO), iron titanium oxide ($FeTiO_3$), barium titanium oxide ($BaTiO_3$), niobium oxide ($Nb_2O_3$) or cerium dioxide ($CeO_2$).

The porous electrochromic layer may further include additional nanoparticles disposed between the nanoparticle clusters.

The nanoparticle clusters have different sizes from each other.

The nanoparticle clusters may have an average diameter from about 100 nanometers (nm) to about 1 micrometer (μm).

The nanoparticles may have an average particle diameter from about 1 nm to about 50 nm.

The porous electrochromic layer may have a reflectance from about 30 percent (%) to about 70%.

The electrochromic device may further include a first substrate and a second substrate disposed opposite the first substrate. The first electrode may be disposed on the first substrate, the second electrode may be disposed on the second substrate, and the first substrate and/or the second substrate may include a polymer.

The electrochromic material may include viologen, a ruthenium bipyridyl complex, an isophthalate-based electrochromic material or a polymer electrochromic material.

Also provided is a method of manufacturing an electrochromic device, and the method includes: applying a conductive paste including nanoparticle clusters to an electrode; heat-treating the conductive paste to form a porous electrochromic layer on the electrode; and immersing the porous electrochromic layer in an electrochromic material solution.

The heat-treating the conductive paste may be performed at a temperature of about 200 degrees Celsius (° C.) or less.

The heat-treating the conductive paste may be performed at a temperature from about 100° C. to about 160° C.

The conductive paste may include a mixture of the nanoparticle clusters and nanoparticles.

The nanoparticle clusters have different sizes from each other.

The conductive paste may include an acid.

Also provided is a composition including a solvent and nanoparticle clusters dispersed in the solvent. Each of the nanoparticle clusters includes nanoparticles.

The nanoparticles may include metal oxide.

The metal oxide may include titanium, tin, zinc, gallium, aluminum, strontium, selenium, niobium, barium, tantalum, zirconium, lead and/or any combinations thereof.

The metal oxide may be $TiO_2$, $SnO_2$, ZnO, PbO, $FeTiO_3$, $BaTiO_3$, $Nb_2O_3$ or $CeO_2$.

The nanoparticle clusters have different sizes from each other.

The nanoparticle clusters may have an average diameter from about 100 nm to about 1 μm.

The nanoparticles may have an average particle diameter from about 1 nm to about 50 nm.

The composition may further include an acid.

BRIEF DESCRIPTION OF THE DRAWINGS

The above and other aspects of the general inventive concept will become more readily apparent by describing in further detail example embodiments thereof with reference to the accompanying drawings, in which.

DETAILED DESCRIPTION

Figure 1:
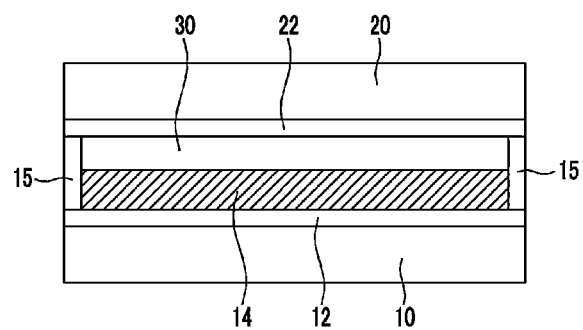
FIG. 1 is a cross-sectional view of an example embodiment of an electrochromic device.

The general inventive concept will now be described more fully with reference to the accompanying drawings, in which various example embodiments are shown. The general inventive concept may, however, be embodied in many different forms, and should not be construed as limited to the example embodiments set forth herein. Rather, these example embodiments are provided so that this disclosure will be thorough and complete, and will fully convey the scope of the general inventive concept to those of ordinary skill in the art. Like reference numerals refer to like elements throughout. It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the general inventive concept.

The terminology used herein is for the purpose of describing example embodiments only, and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated regions, integers, steps, operations, elements, and/or components, but do not preclude the presence or addition of one or more other regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Example embodiments are described herein with reference to cross section illustrations that are schematic illustrations of idealized example embodiments. As such, variations from the shapes of the illustrations as a result, for example, of manufacturing techniques and/or tolerances, are to be expected. Thus, example embodiments described herein should not be construed as limited to the particular shapes of regions as illustrated herein but are to include deviations in shapes that result, for example, from manufacturing. For example, a region illustrated or described as flat may, typically, have rough and/or nonlinear portions. Moreover, sharp angles that are illustrated may be rounded. Thus, the regions illustrated in the figures are schematic in nature and their shapes are not intended to illustrate the precise shape of a region and are not intended to limit the scope of the present claims.

An example embodiment of an electrochromic device will now be described in further detail with reference to FIG. 1.

FIG. 1 is a cross-sectional view of an example embodiment of an electrochromic device.

Referring to FIG. 1, the electrochromic device includes a first (e.g., lower) substrate 10 and a second (e.g., upper) substrate 20 disposed opposite to (facing) the lower substrate 10; a first (e.g., lower) electrode 12, and a second (e.g., upper) electrode 22 disposed on the lower substrate 10 and the upper substrate 20, respectively, as well as an electrolyte 30 disposed between the lower substrate 10 and the upper substrate 20, and a porous electrochromic layer 14 disposed on the lower electrode 12.

The lower substrate 10 and the upper substrate 20 may include, e.g., may be formed of or from, a transparent material such as glass or a polymer resin, for example. Non-limiting examples of the polymer resin include polyacrylate, polyethylene etherphthalate, polyethylene naphthalate, polycarbonate, polyarylate, polyetherimide, polyethersulfone, polypropylene, polyimide, triacetyl cellulose and any combinations of the abovementioned materials, although additional example embodiments are not limited thereto.

The lower electrode 12 may include a transparent conductive material such as inorganic conductive materials including indium tin oxide ("ITO") or fluorine-doped tin oxide ("FTO"), for example, or organic conductive materials such as polyacetylene or polythiophene, but is not limited thereto.

The upper electrode 22 may be formed, for example, from a transparent or an opaque conductive material, such as ITO or FTO, a metal such as aluminum (Al), antimony-doped tin oxide ("ATO,") and any combinations of the foregoing materials.

The lower substrate 10 and upper substrate 20 are fixed by spacers 15, and the electrolyte 30 is disposed, e.g., is filled, between the first substrate 10 and the second substrate 20.

The electrolyte 30 provides an oxidation/reduction ("redox") material for reacting with an electrochromic material 90 (FIG. 3), and may be a liquid electrolyte 30 or a solid electrolyte 30 or solid polymer electrolyte 30, for example. The liquid electrolyte 30 may include, for example, a solution in which a lithium salt such as lithium hydroxide LiOH or lithium perchlorate ($LiClO_4$), a potassium salt such as potassium hydroxide (KOH), or a sodium salt such as sodium hydroxide (NaOH) is dissolved in a solvent, but is not limited thereto. The solid electrolyte 30 may include, for example, poly(2-acrylamino-2-methylpropane sulfonic acid) or polyethylene oxide, but is not limited thereto. The electrolyte 30 may also include a compound, such as ferrocene, for example, which acts as an electron donor and an electron acceptor to increase a rate of the redox reaction.

As shown in FIG. 1, the porous electrochromic layer 14 is disposed on the lower electrode 12.

Figure 2A:
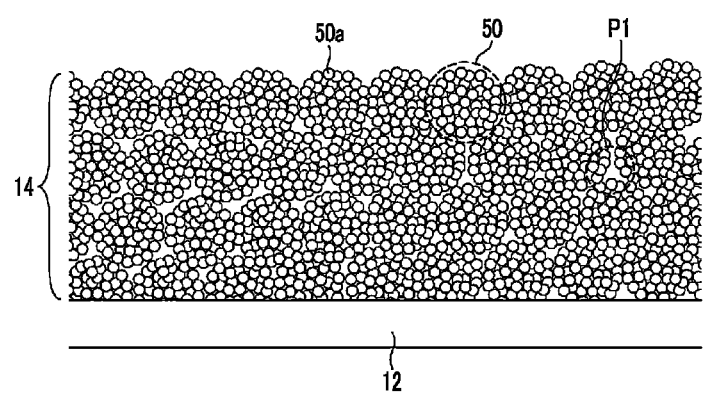
FIG. 2A is an enlarged partial cross-sectional view of a porous electrochromic layer of the electrochromic device shown in FIG. 1.
Figure 2B:
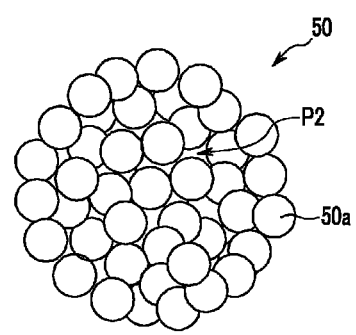
FIG. 2B is an enlarged view of a nanoparticle cluster included in the porous electrochromic layer shown in FIG. 2A.
Figure 3:
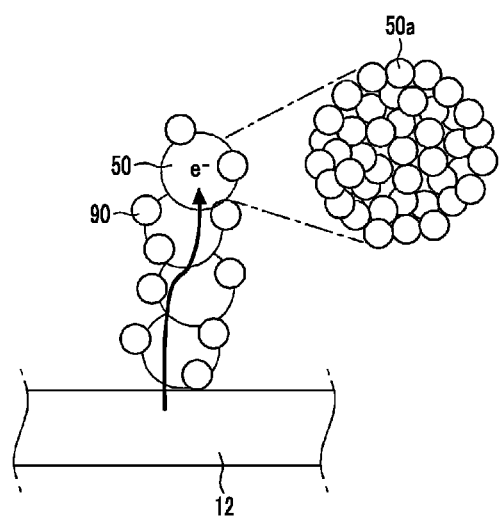
FIG. 3 is a partial cross-sectional view showing electrochromic materials adsorbed onto a surface of a nanoparticle cluster of the electrochromic device shown in FIG. 1.

In an example embodiment, the porous electrochromic layer 14 includes nanoparticle clusters 50 (FIGS. 2A-7B), and each nanoparticle cluster 50 includes a plurality of nanoparticles 50a and the electrochromic material 90 (FIG. 3). In one or more example embodiments, the nanoparticle clusters 50 have different sizes from each other, e.g., the electrochromic display device according to the example embodiments described herein is a multi-pore structure device.

Example embodiments of the porous electrochromic layer 14 will now be described in further detail with reference to FIGS. 2A and 2B.

FIG. 2A is an enlarged partial cross-sectional view of a porous electrochromic layer 14 of the electrochromic device shown in FIG. 1, and FIG. 2B is an enlarged view of a nanoparticle cluster 50 included in the porous electrochromic layer 14 shown in FIG. 2A.

Referring to FIG. 2A, the porous electrochromic layer 14 disposed on the lower electrode 12 includes a plurality of the nanoparticle clusters 50. The nanoparticle clusters 50 have a bunched shape, e.g., a shape in which a plurality of spherical-shaped particles, e.g., the nanoparticles 50a, are bundled together, and the nanoparticle clusters 50 are irregularly arranged on the lower electrode 12. In an example embodiment, the nanoparticle clusters 50 have an average diameter from about 100 nanometers (nm) to about 1 micrometer (μm). As shown in FIG. 2A, the porous electrochromic layer 14 includes a plurality of first pores P1 disposed, e.g., formed, between adjacent nanoparticle clusters 50.

Referring to FIG. 2B, each bundle of nanoparticle clusters 50 includes, e.g., is formed of, a plurality of the nanoparticles 50a that contact each other, and a second pore P2 is thereby formed, e.g., provided, between adjacent nanoparticles 50a in each of the nanoparticle clusters 50. In one or more example embodiments, the nanoparticles 50a that form the nanoparticle cluster 50 each have an average particle diameter from about 1 nm to about 50 nm, although additional embodiments are not limited thereto.

The nanoparticles 50a may include a metal oxide. The metal oxide may include titanium (Ti), tin (Sn), zinc (Zn), gallium (Ga), aluminum (Al), strontium (Sr), Selenium (Se), niobium (Nb), barium (Ba), tantalum (Ta), zirconium (Zr), lead (Pb) or any combinations of the foregoing elements. More particularly, examples of the metal oxide include titanium dioxide ($TiO_2$), tin dioxide ($SnO_2$), zinc oxide (ZnO), lead oxide (PbO), iron titanium oxide ($FeTiO_3$), barium titanium oxide ($BaTiO_3$), niobium oxide ($Nb_2O_3$) and cerium dioxide ($CeO_2$), but are not limited thereto.

The porous electrochromic layer 14 includes electrochromic materials 90 (FIG. 3) adsorbed onto a surface of each of the nanoparticle clusters 50, as will now be described in further detail.

FIG. 3 is a partial cross-sectional view showing electrochromic materials 90 adsorbed onto a surface of a nanoparticle cluster 50 of the electrochromic device shown in FIG. 1.

As shown in FIG. 3, an electrochromic material 90 is adsorbed onto the surface of the nanoparticle cluster 50 and, more particularly, onto the surfaces of the nanoparticles 50a that form the nanoparticle cluster 50. Since the nanoparticle cluster 50 has the bundled shape (in which a plurality of nanoparticles 50a are bundled together around the second pores P2, as described above with reference to FIGS. 2A and 2B), a surface area where adsorption of the electrochromic material 90 takes place is significantly increased at the outer surface of, as well as inside, the nanoparticle cluster 50. Accordingly, color properties of the electrochromic device is substantially improved, due to the adsorbing a significant amount of the electrochromic materials 90 on the nanoparticles 50a and the nanoparticle clusters 50.

Additionally, electron transport properties from the lower electrode 12 to the electrochromic material 90 are significantly increased, since the nanoparticle clusters 50 closely contact each other, and the response speed of the electrochromic device is substantially improved.

As described above, the porous electrochromic layer 14 has a plurality of the first pores P1 (FIG. 2A) disposed between the nanoparticle clusters 50 and a plurality of the second pores P2 (FIG. 2B) disposed between the nanoparticles 50a of the nanoparticle clusters 50, and the electrolyte 30 (FIG. 1) is therefore easily diffused through the first pores P1 and the second pores P2. Accordingly, the response speed of the electrochromic device according to an example is even further improved.

In addition, the nanoparticles 50a, which are spherical, are gathered together to provide the nanoparticle clusters 50, which are also spherical. Accordingly, the nanoparticle clusters 50 have substantially improved scattering properties, due to the increased surface areas thereof. Specifically, for example, the porous electrochromic layer 14, including the nanoparticle clusters 50, may have high reflectance of about 30 percent (%) to about 70% in the visible ray region. Accordingly, a manufacturing process of the electrochromic device is significantly simplified, since the electrochromic device does not require an additional reflector.

A porous electrochromic layer 14 according to another embodiment will now be described in greater detail with reference to FIG. 4.

Figure 4:
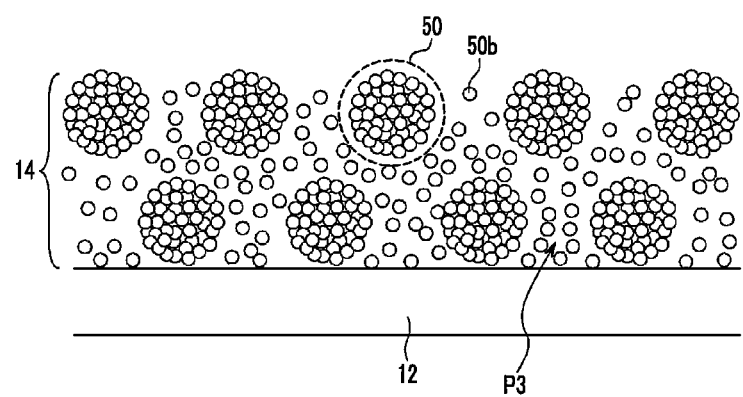
FIG. 4 is an enlarged partial cross-sectional view of another example embodiment of a porous electrochromic layer.

FIG. 4 is an enlarged partial cross-sectional view of another example embodiment of a porous electrochromic layer 14.

As shown in FIG. 4, the porous electrochromic layer 14 disposed on the lower electrode 12 includes a plurality of the nanoparticle clusters 50, each including a plurality of the nanoparticles 50a, as well as additional nanoparticles 50b. In one or more example embodiments the additional nanoparticles 50b may be substantially the same as the nanoparticles 50a, although additional example embodiments are not limited thereto.

As described in greater detail above with reference to FIG. 2B, each nanoparticle cluster 50 has a shape defined by a plurality of the nanoparticles 50a bundled around the first pores P2 (best shown in FIG. 2B), and may have an average particle diameter from about 100 nm to about 1 μm. The additional nanoparticles 50b are disposed between the nanoparticle clusters 50 that are adjacent to each other, and the additional nanoparticles 50b may have an average particle diameter from about 1 nm to about 50 nm, although additional example embodiments are not limited thereto.

As shown in FIG. 4, the porous electrochromic layer 14 includes a plurality of third pores P3 disposed, e.g., formed, between adjacent nanoparticle clusters 50 and between the nanoparticle clusters 50 and the adjacent additional nanoparticles 50b.

A porous electrochromic layer 14 according to yet another example embodiment will now be described in further detail with reference to FIGS. 5A and 5B.

Figure 5A:
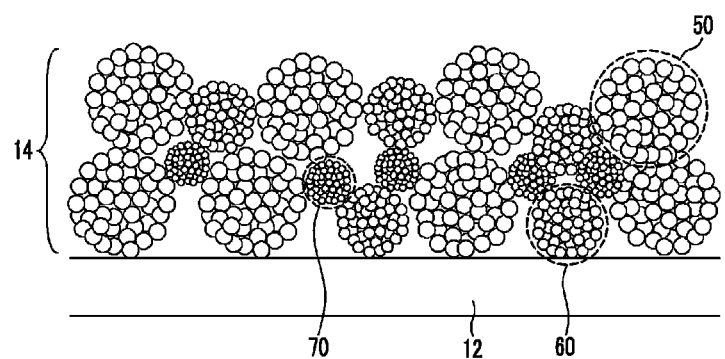
FIG. 5A is an enlarged partial cross-sectional view of yet another example embodiment of a porous electrochromic layer.
Figure 5B:
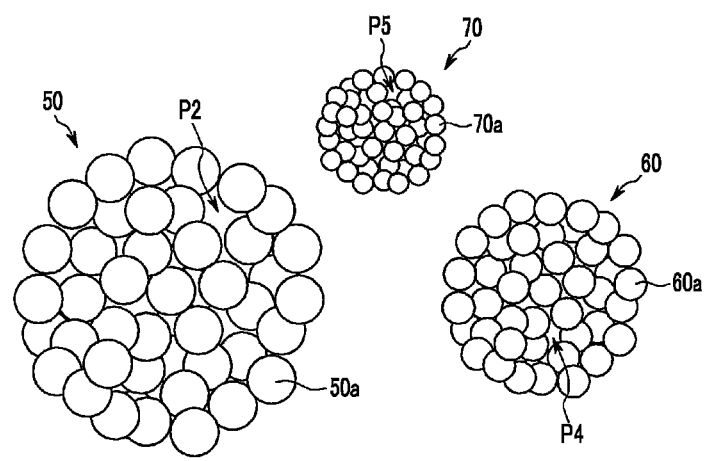
FIG. 5B is an enlarged view of a nanoparticle cluster included in the porous electrochromic layer shown in FIG. 5A.

FIG. 5A is an enlarged partial cross-sectional view of yet another example embodiment of a porous electrochromic layer 14, and FIG. 5B is an enlarged view of different-sized nanoparticle clusters 50, 60 and 70 included in the porous electrochromic layer 14 shown in FIG. 5A.

Referring to FIG. 5A, the porous electrochromic layer 14 disposed on the lower electrode 12 includes a plurality of nanoparticle clusters 50, 60 and 70, each having a different sizes from the others, e.g., the nanoparticle clusters 50 have a different size from the nanoparticles 60 and 70, the nanoparticle clusters 60 have a different size from the nanoparticles 50 and 70, and the nanoparticle clusters 70 have a different size from the nanoparticles 50 and 60, as shown in FIGS. 5A and 5B. In the example embodiment shown in FIGS. 5A and 5B, three different sizes of nanoparticle clusters (50, 60 and 70) are shown, but it will be noted that additional example embodiments are not limited thereto, and may different numbers of nanoparticle clusters having various sizes, e.g., four (4) (or more) different-sized nanoparticle clusters may be included in additional example embodiments. As shown in FIG. 4A, a number of different-sized pores are formed, e.g., are disposed, between adjacent nanoparticle clusters 50, 60 and 70 in the porous electrochromic layer 14, and it will be noted that the number and sizes of the pores will vary, based on the size, number and positioning of the nanoparticle clusters 50, 60 and 70 on the lower electrode 12.

Referring to FIG. 5B, each of the different-sized nanoparticle clusters 50, 60 and 70 forms a shape defined by bundled nanoparticles 50a, 60a and 70a, respectively. Accordingly, each of the nanoparticle clusters 50, 60 and 70 has pores P2, P4 and P5, respectively, disposed, e.g., formed, between the nanoparticles 50a, 60a and 70a, respectively, which are adjacent to each other in each of the corresponding nanoparticle clusters 50, 60 and 70, respectively. More particularly, the nanoparticle clusters 50 may include the second pores P2, discussed in greater detail above with reference to FIG. 2B, while the nanoparticle clusters 60 may include fourth pores P4 and the nanoparticle clusters 70 may include fifth pores P5, as shown in FIG. 5B.

In one or more example embodiments, the average diameter of the nanoparticle clusters 50, 60 and 70 may be from about 100 nm to about 1 μm, while the average particle diameter of nanoparticles 50a, 60a and 70a may be from about 1 nm to about 50 nm, although additional example embodiments are not limited thereto.

In an example embodiment, the porous electrochromic layer 14 includes the nanoparticle clusters 50, 60 and 70, each having different sizes from the others, and the smaller-sized clusters (of the nanoparticle clusters 50, 60 and 70) are closely arranged between the larger-sized nanoparticle clusters of the nanoparticle clusters 50, 60 and 70 (relative to the smaller sized clusters thereof). Accordingly, contact properties between the nanoparticle clusters 50, 60 and 70 are significantly improved. Therefore, an increased amount of the electrochromic materials 90 (FIG. 3) is adsorbed onto the surfaces of the nanoparticle clusters 50, 60 and 70, and the response speed of the electrochromic device is further improved, as are the color display properties of the electrochromic device.

A method of manufacturing an electrochromic device according to yet another example embodiment will now be described in greater detail with reference to FIGS. 1 through 5B.

A conductive paste (not shown) including the nanoparticle clusters 50, 60 and 70 is prepared.

A porous electrochromic layer 14 is provided by mixing a plurality of the nanoparticle clusters 50, 60 and/or 70 with a solvent. The solvent may include, for example, alcohol and water, but is not limited thereto. The conductive paste may include an acid component, such as hydrochloric acid (HCl), for example, although additional example embodiments are not limited thereto. The acid component may assist a dehydration reaction of the nanoparticle clusters 50, 60 and/or 70 during heat treatment.

In an example embodiment, heat treatment is performed at a low temperature, e.g., at a temperature of about 200 degrees Celsius (° C.) or lower, and the dehydration reaction occurs between metal oxide on adjacent surfaces of the nanoparticle clusters 50, 60 and/or 70. As a result, chemical bonds, such as bonds of "[metal of nanoparticle]-[oxygen]-[metal of nanoparticle]"

are generated between the adjacent nanoparticle clusters 50, 60 and/or 70, and contact properties therebetween are therefore substantially improved.

In an example embodiment, the nanoparticle clusters 50, 60 and/or 70 may be included in the conductive paste at about 10 weight percent (wt %) to about 50 wt %, based on a total amount of conductive paste, and according to at least one example embodiment, the nanoparticle clusters 50, 60 and/or 70 may be included at about 20 wt % to about 25 wt %.

In another example embodiment, a porous electrochromic layer 14 is provided by mixing a plurality of nanoparticle clusters 50, 60 and/or 70 and a plurality of nanoparticles 50a and/or 50b with a solvent. The nanoparticle clusters 50, 60 and/or 70 and the nanoparticles 50a and/or 50b may be mixed in a weight ratio from about 0.02:0.98 to about 0.65:0.35, and according to at least one example embodiment, may be mixed in a weight ratio from about 0.10:0.90 to about 0.50:0.50. Heat treatment, as described in greater detail above may be performed on the nanoparticle clusters 50, 60 and/or 70 and the nanoparticles 50a and/or 50b.

A porous electrochromic layer 14 according to still another example embodiment is provided by mixing a plurality of nanoparticle clusters 50, 60 and/or 70, each having different sizes from each other, with a solvent.

An electrode, e.g., the lower electrode 12 (FIG. 1) is formed on a substrate, e.g., the lower substrate 10 (FIG. 1), and the conductive paste, described in greater detail above, is applied to the electrode.

The conductive paste, which is applied to the electrode, is subjected to heat treatment. In an example embodiment, the heat treatment may be performed at a low temperature, e.g., at a temperature of about 200° C. or lower and, according to at least one example embodiment, may be carried out at a temperature from about 100° C. to about 160° C. The solvent is removed by the heat treatment, and contact properties of the nanoparticle clusters 50, 60 and/or 70 is substantially increased to provide the porous electrochromic layer 14 having a substantially film shape.

When the conductive paste includes the plurality of the nanoparticle clusters 50, 60 and/or 70, the plurality of the nanoparticles 50*a* and/or 50*b*, and a volume reduction occurs due to evaporation of the solvent, the nanoparticles 50*a* and/or 50*b* move to a portion of the porous electrochromic layer 14 where the volume reduction occurred, thus increasing the contact properties between the nanoparticle clusters 50, 60 and/or 70 and the nanoparticles 50*a* and/or 50*b*. When the conductive paste includes the plurality of nanoparticle clusters 50, 60 and/or 70, having different sizes from each other and a volume reduction occurs due to the evaporation of the solvent, the smaller-sized nanoparticle clusters (of the nanoparticle clusters 50, 60 and/or 70) move to a portion where volume reduction occurs, thereby increasing the contact properties between all of the nanoparticle clusters 50, 60 and/or 70. Therefore, a structure stress is substantially reduced, in comparison to an electrochromic device including nanoparticle clusters having a uniform size.

Accordingly, the contact properties between the nanoparticle clusters are substantially improved. Therefore, heat treatment at high temperature, e.g., at a temperature substantially greater than about 200° C., is not required, and thus the manufacturing method according to one or more example embodiments, is applicable to a flexible electrochromic device, such as an electrochromic device including a polymer substrate, for example.

The porous electrochromic layer 14 is immersed in an electrochromic material solution. Electrochromic materials 90 (FIG. 3) in the electrochromic material solution may include, for example, a viologen compound, although additional example embodiments are not limited thereto. The porous electrochromic layer 14 is immersed for about 2 hours or more to adsorb the electrochromic materials 90 onto the porous electrochromic layer 14.

Another electrode, e.g, the upper electrode 22 (FIG. 1) is formed on another substrate, e.g., the upper substrate 20 (FIG. 1), and both of the substrates, including the electrodes disposed thereon are combined, e.g., are assembled, and an electrolyte 30 (FIG. 1) is disposed therebetween to provide the electrochromic device according to an example embodiment.

Several specific example embodiments will now be described to illustrate the general inventive concept in further detail. However, it will understood that the specific example embodiments described herein are not limiting.

For a first example embodiment ("Example 1"), an electrode made of fluorine-included tin oxide ("FTO") is laminated on a polyimide substrate, and one surface of the electrode is masked on an area of 0.28 square centimeters (cm$^2$) with an adhesive tape. A titanium oxide (TiO$_2$) nanoparticle cluster having a diameter of 200 nm is prepared and mixed with a solvent including ethanol:water:hydrochloric acid in a volume ratio of 12:5:1 to provide a conductive paste. The titanium oxide is added at 20%, based on a total amount of the conductive paste. The conductive paste is coated on the electrode, using a doctor-blade method, for example, and is and heated at 140° C. for 10 minutes to provide a porous layer having a thickness of about 9 μm. The substrate formed with the porous layer is immersed in an ethanol solution in which a viologen electrochromic material of bis(2-phosphonoethyl-4,40-bipyridinium dibromide) is dissolved at a concentration of 0.5 millimolar (mM) for 12 hours to uniformly adsorb the electrochromic material onto the porous layer. The substrate is washed with ethanol several times to remove electrochromic material that is not adsorbed in the titanium oxide and the substrate is dried at 60° C.

Another electrode made of antimony-doped tin oxide ("ATO") is formed on another polyimide substrate, and 0.5M of LiClO$_4$ electrolyte is disposed on the other electrode. Both substrates are assembled to form an electrochromic device.

For a second example exemplary embodiment ("Example 2"), an electrochromic device is fabricated in accordance with the same procedure as in Example 1, except that TiO$_2$ nanoparticle clusters having a diameter of 200 nanometers (nm) are mixed with TiO$_2$ nanoparticles having a diameter of 20 nm in a weight ratio of 25:75 (instead of using the TiO$_2$ nanoparticle clusters having a diameter of 200 nm).

For a third example embodiment ("Example 3"), an electrochromic device is fabricated in accordance with the same procedure as in Example 1, except that TiO$_2$ nanoparticle clusters having various diameters are mixed instead of using TiO$_2$ nanoparticle clusters having a diameter of 200 nm.

For a first comparative example ("Comparative Example 1"), an electrochromic device is fabricated in accordance with the same procedure as in Example 1, except that TiO$_2$ nanoparticles having a diameter of 20 nm are used instead of TiO$_2$ nanoparticle clusters having a diameter of 200 nm.

For a second comparative example ("Comparative Example 2"), an electrochromic device is fabricated in accordance with the same procedure as in Example 1, except that TiO$_2$ nanoparticles having a diameter of 20 nm are used instead of TiO$_2$ nanoparticle clusters having a diameter of 200 nm, and the heat treatment is performed at 450° C. (not 140° C.) for 20 minutes (not 10 minutes).

Figure 6A:
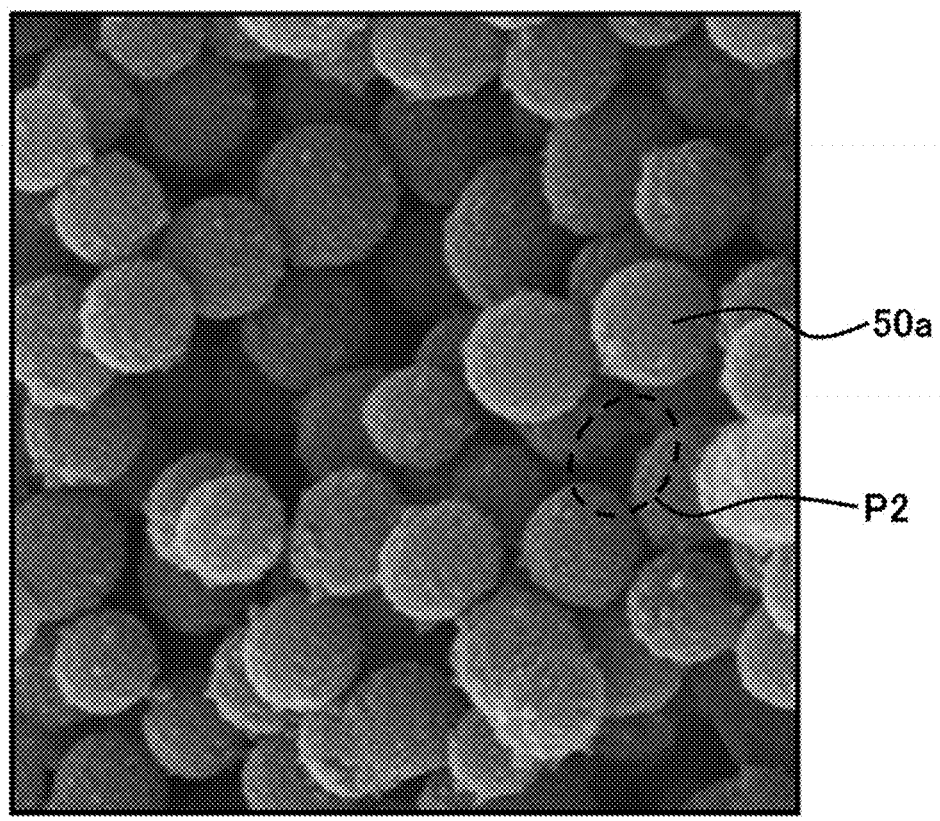
FIGS. 6A and 6B are scanning electron microscope ("SEM") and transmission electron microscope ("TEM") photographs of a porous electrochromic layer according to a first example embodiment.
Figure 6B:
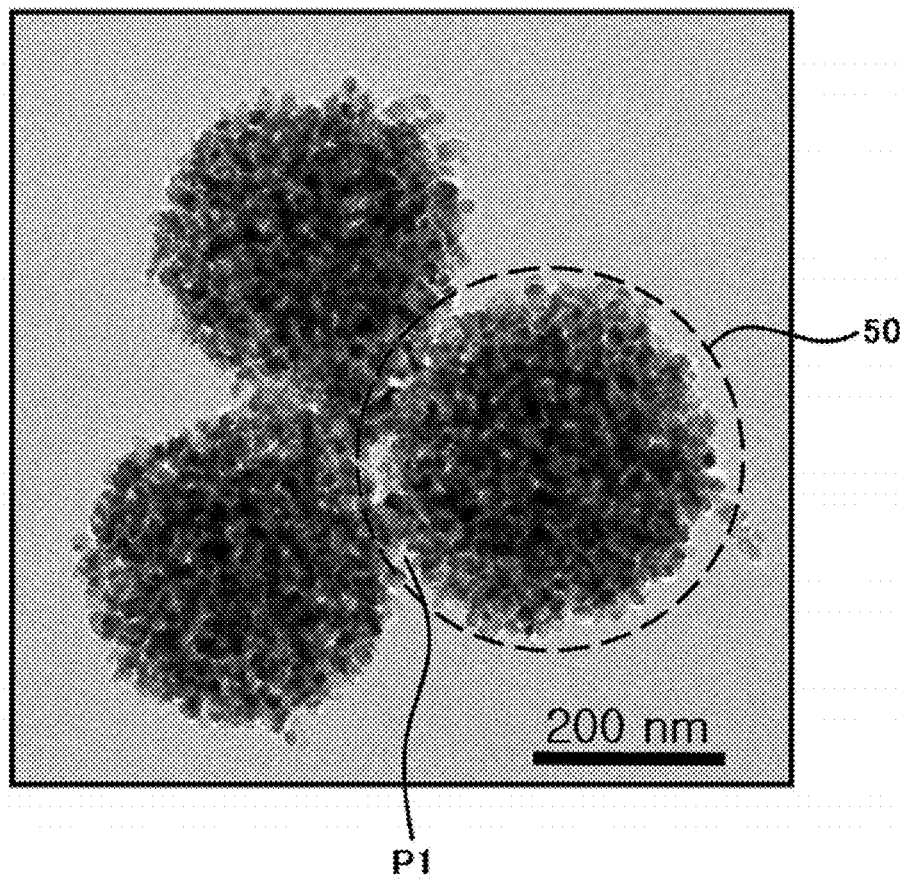
Figure 7A:
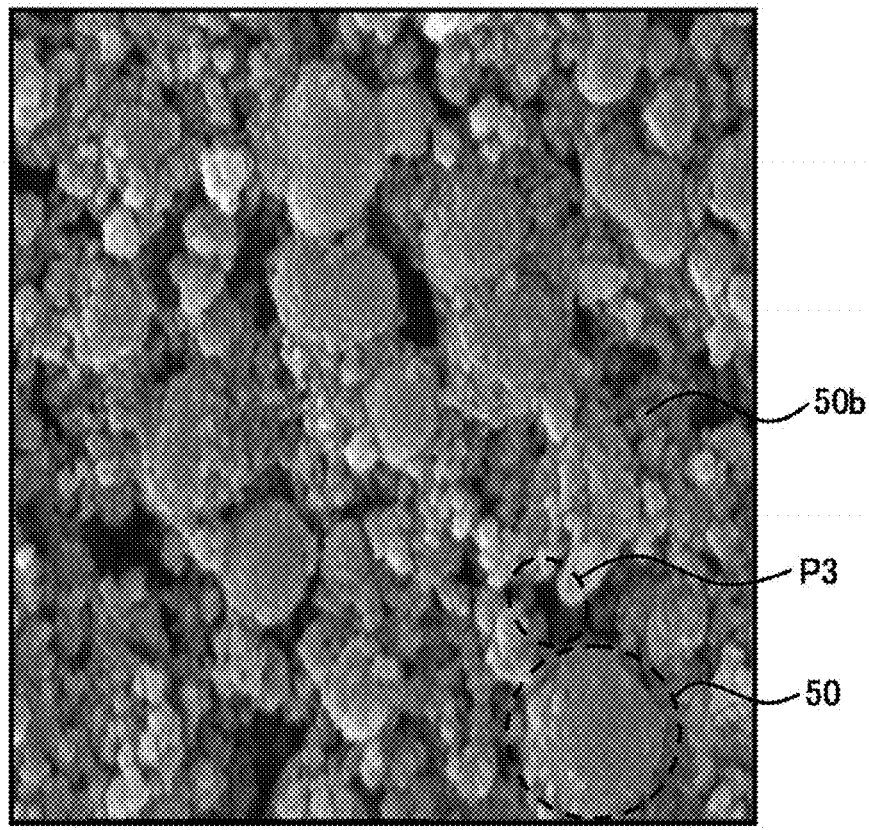
FIGS. 7A and 7B are SEM and TEM photographs of a porous electrochromic layer according to a second example embodiment.
Figure 7B:
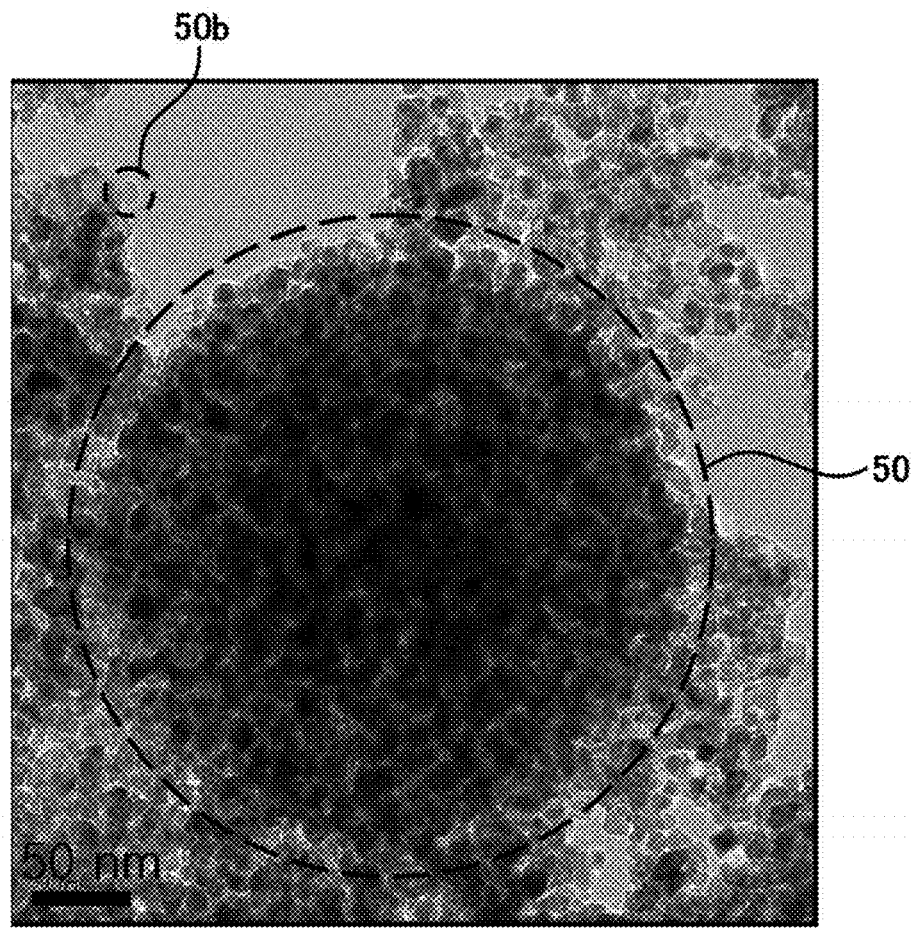

For purposes of evaluation, the porous layers of the example embodiments of electrochromic devices obtained from Example 1 and Example 2 are observed with a scanning electron microscope ("SEM") and transmission electron microscope ("TEM.") Specifically, FIGS. 6A and 6B are SEM and TEM photographs of the porous electrochromic layer according to Example 1, and FIGS. 7A and 7B are SEM and TEM photographs of the porous electrochromic layer according to Example 2.

As shown in FIGS. 6A and 6B, the porous layer of Example 1 includes nanoparticle clusters 50 in which a plurality of nanoparticles 50*a* are bundled. Additionally, pores P1 are present between the nanoparticle clusters 50 (FIG. 6B), while pores P2 are present between adjacent nanoparticles 50*a* (FIG. 6A).

As shown in FIGS. 7A and 7B, the porous layer of Example 2 includes a plurality of nanoparticle clusters 50 and nanoparticles 50*b* having a small size, and pores P3 are visible between adjacent nanoparticles 50*b*.

The response speeds of the electrochromic devices according to the example embodiments was measured, and is described in greater detail below. As used herein, the response speed is a speed of coloring and bleaching in an electrochromic display, and is defined as a time required for the entire color to change by 90%. The response speed is determined by an amount of reflected light after irradiating a beam from a helium-neon (He—Ne) laser onto to the electrochromic device.

Specifically, to test the response speed, the electrochromic device is supplied with a voltage of positive ("+") 1.5 volts (V) and a blue color is observed, and a voltage of negative ("−") 1.5 V is applied to transfer the electrochromic device to no color. As a reflectance of the colored state is different from a reflectance of the bleached state, an amount of light is represented as a pulse-type signal of an oscilloscope. The time for the entire color to change by 90% is measured from a pulse-type signal graph of the oscilloscope.

A response speed, in milliseconds (ms), of electrochromic devices according to Examples 1-3 and Comparative Examples 1 and 2 is measured. The results are shown in Table 1.

TABLE 1

|  | Coloring time (ms) | Bleaching time (ms) |
|---|---|---|
| Example 1 | 130 ms | 270 ms |
| Example 2 | 130 ms | 530 ms |
| Example 3 | 130 ms | 360 ms |
| Comparative Example 1 | 130 ms | 700 ms |
| Comparative Example 2 | 120 ms | 210 ms |

Referring to Table 1, it can be seen that the electrochromic device according to Examples 1 to 3 has a higher response speed than the response speed of Comparative Example 1. On the other hand, the electrochromic device according to Example 1 has a similar response speed to that according to Comparative Example 2, which was heat-treated at 450° C. However, it should be noted that heat-treating at 450° C. is not applicable for a flexible electrochromic device, such as an electrochromic device including a polymer substrate, as in the example embodiments described herein. Moreover, the example embodiments described herein further provide additional advantages, as will now be described in further detail.

The surface area of nanoparticle clusters used in Example 1 and nanoparticles of Comparative Example 1 is measured. The surface area, in square meters per gram ($m^2/g$) is measured by a surface area measurer to determine the [Brunauer, Emmett and Teller ("BET")] surface area according to a nitrogen absorption/desorption method at a wavelength of about 600 nm. The results are shown in Table 2.

TABLE 2

|  | BET surface area ($m^2/g$) |
|---|---|
| Nanoparticle cluster ($TiO_2$ having a diameter about 200 nm) | 104.7 |
| Nanoparticle ($TiO_2$ having a diameter about 20 nm) | 63.8 |

As shown in Table 2, the nanoparticle clusters have a greater surface area than that of the nanoparticles.

To measure color properties of electrochromic devices in a wavelength region from about 400 nm to about 800 nm, the electrochromic devices of Example 2 and Comparative Example 1 are measured to determine a reflectance thereof using an ultraviolet ("UV")-visible ray spectrophotometer (specifically, using a Perkin-Elmer Lambda 40 spectrophotometer). As used herein, reflectance refers to the reflectance, in percent (%), in an on-state (when a voltage is applied), and is different from the reflectance in an off-state (when the voltage is not applied). In the on-state, the reflectance has an inverse relationship with the color converting degree, which indicates that lower reflectance indicates a darker color. The results are described below with reference to Table 3 and FIG. 8.

TABLE 3

|  | Reflectance (%) @600 nm |
|---|---|
| Example 2 | 9.288 |
| Comparative Example 1 | 11.369 |
| Comparative Example 2 | 16.896 |

Figure 8:
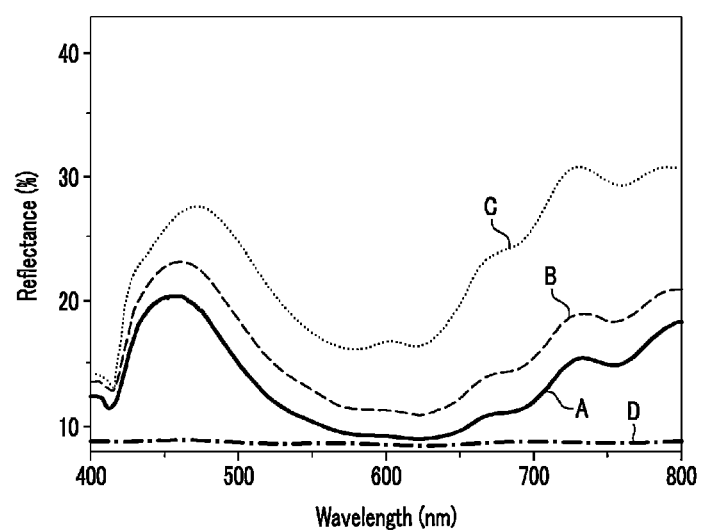
FIG. 8 is a graph of reflectance, in percent (%), versus wavelength, in nanometers (nm), of the second example embodiment of FIGS. 7A and 7B and two comparative examples.

FIG. 8 is a graph of reflectance, in percent, versus wavelength, in nanometers, showing on-state reflectance of electrochromic devices according to Example 2 and Comparative Examples 1 and 2.

Referring to FIG. 8, the viologen electrochromic material used in Example 2 and Comparative Examples 1 and 2 had the lowest reflectance around the wavelength of about 600 nm, since it expresses a dark blue color.

Referring to Table 3 and FIG. 8, the electrochromic device (graph "A") according to Example 2 had reflectance of 9.288% at a wavelength of about 600 nm, while the electrochromic device according to Comparative Example 1 (graph "B") and the electrochromic device according to Comparative Example 2 (graph "C") had reflectances of 11.369% and 16.896%, respectively. Graph "D" in FIG. 8 illustrates the reflectivity of bare glass. Thus, the electrochromic device according to Example 2 has a higher color converting efficiency than that of Comparative Examples 1 and 2, which is due to increasing the adsorbing amount of the electrochromic material since the surface areas are increased by adding the porous nanoparticle clusters, as described in greater above.

Thus, the reflectance is decreased in the on-state, which is the state of expressing the color, so that the contrast ratio of an electrochromic display according to an exemplary embodiment is significantly increased.

The general inventive concept should not be construed as being limited to the example embodiments set forth herein. Rather, these example embodiments are provided so that this disclosure will be thorough and complete and will fully convey the concept of the present invention to those skilled in the art. For example, an additional example embodiment provides a composition including a solvent and nanoparticle clusters dispersed in the solvent, and each of the nanoparticle clusters includes nanoparticles. As discussed in greater detail above, the nanoparticle clusters have different sizes from each other.

While the general inventive concept has been particularly shown and described with reference to example embodiments thereof, it will be understood by those of ordinary skill in the art that various changes in form and details may be made therein without departing from the spirit or scope of the general inventive concept as defined by the following claims.

What is claimed is:

1. An electrochromic device comprising:
   a first electrode;
   a second electrode disposed opposite the first electrode;
   a porous electrochromic layer disposed on one of the first electrode and the second electrode; and
   an electrolyte disposed between the first electrode and the second electrode,
   wherein the porous electro chromic layer comprises:
      nanoparticle clusters, each including nanoparticles;
      an electrochromic material;

first pores disposed between adjacent nanoparticle clusters; and second pores disposed between adjacent nanoparticles inside each of the nanoparticle clusters.

2. The electrochromic device of claim 1, wherein the nanoparticles comprise metal oxide.

3. The electrochromic device of claim 2, wherein the metal oxide comprises at least one selected from a group consisting of titanium, tin, zinc, gallium, aluminum, strontium, selenium, niobium, barium, tantalum, zirconium, lead and any combinations thereof.

4. The electrochromic device of claim 2, wherein the metal oxide is one of titanium dioxide, tin dioxide, zinc oxide, lead oxide, iron titanium oxide, barium titanium oxide, niobium oxide or cerium dioxide.

5. The electrochromic device of claim 1, wherein the porous electrochromic layer further comprises additional nanoparticles disposed between the nanoparticle clusters.

6. The electrochromic device of claim 1, wherein the nanoparticle clusters have different sizes from each other.

7. The electrochromic device of claim 1, wherein the nanoparticle clusters have an average diameter from about 100 nanometers to about 1 micrometer.

8. The electrochromic device of claim 1, wherein the nanoparticles have an average particle diameter from about 1 nanometer to about 50 nanometers.

9. The electrochromic device of claim 1, wherein the porous electrochromic layer has a reflectance from about 30 percent to about 70 percent.

10. The electrochromic device of claim 1, further comprising:
a first substrate; and
a second substrate disposed opposite the first substrate, wherein
the first electrode is disposed on the first substrate,
the second electrode is disposed on the second substrate, and
at least one of the first substrate and the second substrate comprises a polymer.

11. The electrochromic device of claim 1, wherein the electrochromic material comprises one of viologen, a ruthenium bipyridyl complex, an isophthalate-based electrochromic material and a polymer electrochromic material.

12. A method of manufacturing an electrochromic device, the method comprising:
applying a paste including nanoparticle clusters to an electrode;
heat-treating the paste to form a porous electrochromic layer on the electrode; and
immersing the porous electrochromic layer in an electrochromic material solution.

13. The method of claim 12, wherein the heat-treating the paste is performed at a temperature of about 200 degrees Celsius or less.

14. The method of claim 12, wherein the heat-treating the paste is performed at a temperature from about 100 degrees Celsius to about 160 degrees Celsius.

15. The method of claim 12, wherein the paste comprises a mixture of the nanoparticle clusters and nanoparticles.

16. The method of claim 12, wherein the nanoparticle clusters have different sizes from each other.

17. The method of claim 12, wherein the paste comprises an acid.

18. A composition comprising:
a solvent; and
nanoparticle clusters dispersed in the solvent,
wherein each of the nanoparticle clusters includes nanoparticles,
wherein the nanoparticle clusters comprise pores disposed between adjacent nanoparticles inside each of the nanoparticle clusters.

19. The composition of claim 18, wherein the nanoparticles comprise metal oxide.

20. The composition of claim 19, wherein the metal oxide comprises at least one selected from a group consisting of titanium, tin, zinc, gallium, aluminum, strontium, selenium, niobium, barium, tantalum, zirconium, lead and any combinations thereof.

21. The composition of claim 18, wherein the metal oxide is one of titanium dioxide, tin dioxide, zinc oxide, lead oxide, iron titanium oxide, barium titanium oxide, niobium oxide or cerium dioxide.

22. The composition of claim 18, wherein the nanoparticle clusters have different sizes from each other.

23. The composition of claim 18, wherein the nanoparticle clusters have an average diameter from about 100 nanometers to about 1 micrometer.

24. The composition of claim 18, wherein the nanoparticles have an average particle diameter from about 1 nanometer to about 50 nanometers.

25. The composition of claim 18, further comprising an acid.

* * * * *